(12) United States Patent
Xinfang

(10) Patent No.: US 9,506,446 B2
(45) Date of Patent: Nov. 29, 2016

(54) MOBILE POWER BANK

(71) Applicant: Spacekey (USA), Inc., La Puente, CA (US)

(72) Inventor: Liu Xinfang, Guangzhou (CH)

(73) Assignee: SPACEKEY (USA), INC., La Puente, CA (US)

( * ) Notice: Subject to any disclaimer, the term of this patent is extended or adjusted under 35 U.S.C. 154(b) by 349 days.

(21) Appl. No.: 14/069,262

(22) Filed: Oct. 31, 2013

(65) Prior Publication Data

US 2015/0054336 A1   Feb. 26, 2015

(51) Int. Cl.
| | | |
|---|---|---|
| B60L 1/00 | (2006.01) | |
| F02N 11/12 | (2006.01) | |
| B60R 16/033 | (2006.01) | |
| H02J 7/00 | (2006.01) | |
| B60L 11/18 | (2006.01) | |
| H02J 1/00 | (2006.01) | |

(52) U.S. Cl.
CPC ............ *F02N 11/12* (2013.01); *B60R 16/033* (2013.01); *H02J 7/0047* (2013.01); *H02J 7/0054* (2013.01); *B60L 11/1816* (2013.01); *H02J 1/00* (2013.01); *H02J 2001/006* (2013.01); *H02J 2007/005* (2013.01)

(58) Field of Classification Search
CPC ... B60R 16/033; H02J 7/0047; H02J 7/0054; H02J 2007/005; H02J 1/00; H02J 2001/006; F02N 11/12; B60L 11/1816
See application file for complete search history.

(56) References Cited

U.S. PATENT DOCUMENTS

| | | | | | |
|---|---|---|---|---|---|
| 5,793,185 A | * | 8/1998 | Prelec | ................. | H01M 2/1072 320/104 |
| 8,324,868 B2 | * | 12/2012 | Choi | ....................... | B60K 6/28 307/64 |
| 2003/0222505 A1 | * | 12/2003 | Randall | .................... | H02J 7/345 307/64 |
| 2004/0054775 A1 | * | 3/2004 | Poliac | ................... | G06F 19/363 709/224 |
| 2009/0206841 A1 | * | 8/2009 | Weng | ................. | G01R 31/3658 324/426 |
| 2010/0060203 A1 | * | 3/2010 | Holmes | ............. | H05B 33/0815 315/307 |
| 2010/0109931 A1 | * | 5/2010 | Esnard | .................... | H01F 38/14 341/176 |
| 2012/0130153 A1 | * | 5/2012 | Bolyard | .............. | A61M 1/1086 600/17 |
| 2013/0101874 A1 | * | 4/2013 | Pevear | ................... | H02J 7/0026 429/50 |
| 2013/0154543 A1 | * | 6/2013 | Richardson | ............. | H02J 7/007 320/104 |
| 2014/0139175 A1 | * | 5/2014 | Gonzalez | ................. | F02N 11/12 320/101 |
| 2015/0028797 A1 | * | 1/2015 | Miller | .................... | H02J 7/0042 320/103 |
| 2015/0207339 A1 | * | 7/2015 | Hamburgen | ............ | H02J 7/007 320/103 |
| 2015/0228419 A1 | * | 8/2015 | Fadell | .................... | G08B 17/00 307/112 |

* cited by examiner

*Primary Examiner* — Daniel Cavallari
(74) *Attorney, Agent, or Firm* — Sanford Astor, Esq.; Brooks Kushman P.C.

(57) ABSTRACT

An apparatus for providing power, the apparatus having a housing; a battery module positioned inside of the housing, the battery module having: a battery, a battery circuit board coupled to the battery and an ignition output port coupled to the battery circuit board; a circuit board positioned inside of the housing and coupled to the battery module, the circuit board having: a charge module, a discharge module, a lighting module and a control module coupled to the charge module, the discharge module and the lighting module; a light source coupled to the circuit board; and wherein the apparatus is configured to provide sufficient power to jump start a vehicle.

25 Claims, 7 Drawing Sheets

MOBILE POWER BANK

CROSS REFERENCE TO RELATED APPLICATION

This application claims priority of Chinese Patent Application No. 201320516513.9, filed on Aug. 23, 2013, the entire contents of which are hereby incorporated herein by reference. This application claims priority of Chinese Patent Application No. 201320516504.X, filed on Aug. 23, 2013, the entire contents of which are hereby incorporated herein by reference. This application claims priority of Chinese Patent Application No. 201330403682.7 filed on Aug. 14, 2013, the entire contents of which are hereby incorporated herein by reference.

BACKGROUND OF THE INVENTION

The present invention relates to mobile power technology and, more particularly, to a mobile power bank capable of charging electronic devices, jump starting an ignition system of a vehicle with a weak or dead battery, and operating as a flashlight.

A car needs high, instantaneous voltage current to achieve ignition start, usually provided by a car battery. However, when there is insufficient power from the car battery to start ignition, the traditional solution is to wait for a tow truck service to assist with jump starting the car battery. Waiting for a tow truck to arrive may cause substantial delay and inconvenience.

To solve this problem, there are traditional mobile jump starters that can be used to jump start a car battery by connecting cable clamps to the positive and negative posts of the car battery to start vehicle ignition. However, these traditional portable jump starters only have a single function and cannot meet the demand for multi-function mobile power. Moreover, often traditional portable jump starters are large and inconvenient to carry and store.

Accordingly, there is a need for an improved jump starter that remedies the shortcomings of the prior art and provides additional functionality.

SUMMARY OF THE INVENTION

The present invention according to an embodiment provides a mobile power bank, vehicle ignition system jump starter, and a flashlight. The mobile power bank is capable of jump starting a vehicle by providing power for a vehicle ignition and starter motor.

Accordingly, the present invention according to an embodiment is directed to an apparatus for providing power comprising: a housing; a battery module positioned inside of the housing, the battery module further comprising: a battery, a battery circuit board coupled to the battery and an ignition output port coupled to the battery circuit board. The apparatus further comprises a circuit board positioned inside of the housing and coupled to the battery module, the circuit board further comprising: a charge module; a discharge module; a lighting module; and a control module coupled to the charge module, the discharge module and the lighting module. The apparatus further comprises a light source coupled to the circuit board. The apparatus is configured to provide sufficient power to jump start a vehicle.

In an embodiment, the ignition output port outputs power at a voltage higher than about 13.6 volts. The ignition output port may further comprise a positive and negative barrel jack. The battery may comprise a lithium iron phosphate battery cell or a lithium cobalt oxide battery cell. Optionally, the battery circuit board is configured to boost battery voltage output to the ignition output board to above about 13.6 volts.

The charge module may further comprises a constant current and constant voltage input circuit, an over-charge and over-voltage protection circuit, and a charging module power test circuit. Optionally, the discharge module further comprises a constant current and constant voltage output circuit, a discharge module over-discharge protection circuit, and a discharge module power test circuit. The lighting module may further comprise a lighting module over-discharge protection circuit and a lighting module power test circuit. The battery circuit board may be coupled to the circuit board by a ribbon cable.

In an embodiment, the apparatus further comprises a charging port coupled to the charging module, at least one Universal Serial Bus interface coupled to the discharge module, and a Light Emitting Diode indicator module coupled to the circuit board. The Light Emitting Diode indicator module is configured to indicate a charge level of the battery. Optionally, the charging port, the at least one Universal Serial Bus interface, Light Emitting Diode indicator module, and ignition output port are sequentially arranged on a side of the housing. The apparatus may further comprise two Universal Serial Bus interfaces, wherein the ignition output port is positioned adjacent to a first side of the charging port, and the two USB (Universal Serial Bus) interfaces are positioned adjacent to a second side of the charging port and the Light Emitting Diode indicator module is positioned in between the two Universal Serial Bus interfaces.

In an embodiment, the circuit board further comprises a master control button and the housing further comprises a button cap positioned adjacent the master control button such that operation of the button cap causes operation of the master control button. Optionally, the apparatus further comprises an external charging circuit adapter having a first end coupleable to the charging port and a second end coupleable to an external power supply. Optionally, the apparatus further comprises a vehicle ignition cable having a first end coupleable to the ignition output port and a second end coupleable to terminals of a vehicle battery. In an embodiment of the present invention, the apparatus is configured to be storable in a clothing pocket, carry bag, glove box or trunk of a vehicle.

In an additional embodiment, the present invention is directed to an apparatus for providing power comprising: a housing; a battery module positioned inside of the housing, the battery module having a battery with a lithium iron phosphate battery cell or a lithium cobalt oxide battery cell; a battery circuit board coupled to the battery; and an ignition output port coupled to the battery circuit board. A circuit board is positioned inside of the housing and coupled to the battery module, the circuit board further comprising: a charge module having a constant current and constant voltage input circuit, an over-charge and over-voltage protection circuit, and a charging module power test circuit; a discharge module having a constant current and constant voltage output circuit, a discharge module over-discharge protection circuit, and a discharge module power test circuit; a lighting module having a lighting module over-discharge protection circuit and a lighting module power test circuit; and a control module coupled to the charge module, the discharge module and the lighting module. The apparatus further comprises: a light source coupled to the circuit board; a charging port coupled to the charging module; at least one Universal Serial Bus interface coupled to the discharge module; and a Light Emitting Diode indicator module coupled to the circuit board and configured to indicate a charge level of the battery; wherein the apparatus is configured to provide sufficient power to jump start a vehicle at a voltage higher than about 13.6 volts.

Optionally, the apparatus further comprises an external charging circuit adapter having a first end coupleable to the charging port and a second end coupleable to an external power supply. Optionally, the apparatus further comprises a vehicle ignition cable having a first end coupleable to the ignition output port and a second end coupleable to terminals of a vehicle battery. The apparatus may be configured to be storable in a clothing pocket. Optionally, the circuit board may include a battery voltage protection board and a voltage stabilizer board.

A mobile power bank according to an embodiment of the present invention provides mobile power for vehicle ignition starting, and also provides mobile power charging for electronic devices and functions as a flashlight to provide multifunctional mobile power needs. In addition, the mobile power control circuit board contains a variety of protection circuits that can effectively extend battery life and reduce battery damage.

BRIEF DESCRIPTION OF THE DRAWINGS

The features, aspects and advantages of the present invention will become better understood with regard to the following description, appended claims and accompanying figures wherein:

DETAILED DESCRIPTION OF THE PREFERRED EMBODIMENTS

Figure 1:
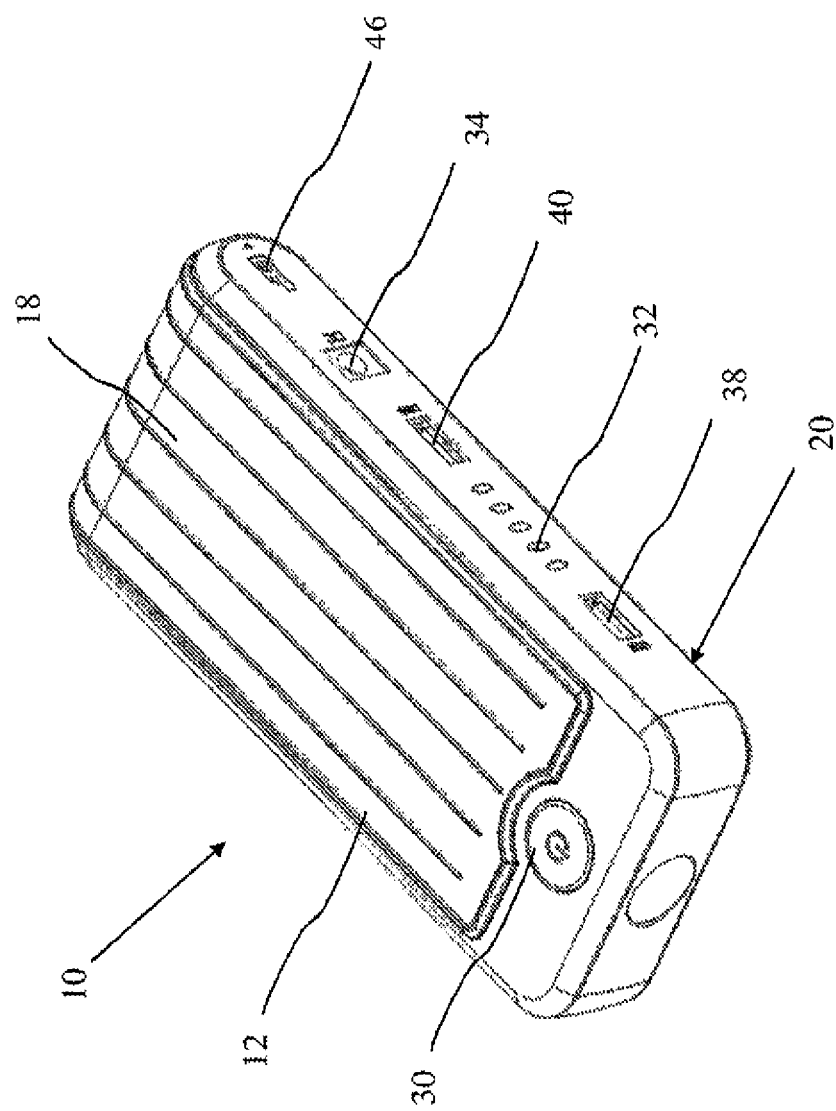
FIG. 1 is an outside perspective elevation view of a mobile power bank according to an embodiment of the present invention.
Figure 2:
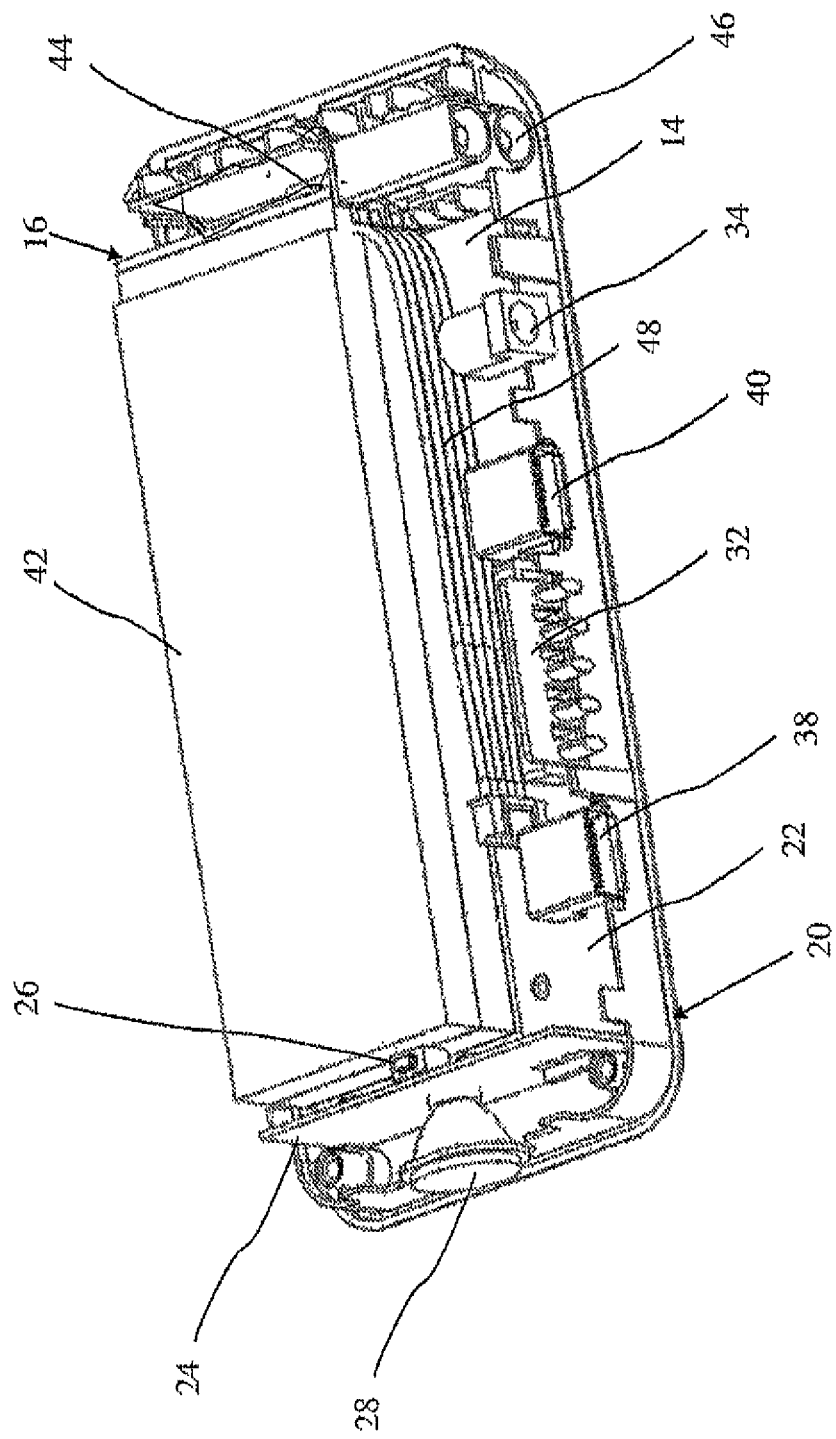
FIG. 2 is a perspective elevation view of a mobile power bank according to FIG. 1 with an upper cover removed.

In the following description of the preferred embodiments, reference is made to the accompanying drawings which show by way of illustration specific embodiments in which the invention may be practiced. Wherever possible, the same reference numbers will be used throughout the drawings to refer to the same or like parts. It is to be understood that other embodiments may be utilized and structural and functional changes may be made without departing from the scope of the present invention.

A mobile power bank 10 according to an embodiment of the present invention is shown in FIGS. 1 to 9. The mobile power bank 10 functions as a mobile power bank, vehicle battery jump starter, and a flashlight. The mobile power bank 10 may be used to start a vehicle. If the vehicle battery power is low, the mobile power bank 10 can be used to jump start the ignition.

The mobile power bank 10 includes a housing 12, a control circuit board 14, and a battery module 16. The housing 12 comprises an upper cover 18 and a base cover 20. The upper cover 18 is coupled to the base cover 20 to form an enclosed, storage space. The control circuit board 14 and the battery module 16 may be accommodated and fixed inside the storage space.

The control circuit board 14 is mounted on an inner surface of the base cover 20. The base cover 20 has a first plate 22 perpendicular to the base cover. An edge of the first plate 22 is connected to a second plate 24. The first plate 22 and the second plate 24 may be connected to each other via printed designated lines on the control circuit board 14. Both the first plate 22 and the second plate 24 can be further mounted to the base cover 20.

The second plate 24 may be provided with a master control button 26 and a flashlight 28. The flashlight 28 and the master control button 26 may be positioned on opposite surfaces of the second plate 24. Preferably, the flashlight 28 is placed adjacent to an edge of the base cover 20. In an embodiment, the master control button 26 is operable in a direction parallel to the second plate 24. The upper cover 18 is provided with a button cap 30 in the corresponding position of the master control button 26. The button cap 30 may be operated by a user to press the master control button 26.

The first plate 22 may be provided with a LED (Light Emitting Diode) indicator module 32, a charging port 34, and a USB (Universal Serial Bus) output module 36. The LED indicator module 32, the charging port 34, and the USB output module 36 may be provided in the body of the first plate 22, on the same side and near an edge of the base cover 20. The USB output module 36 may include two USB interfaces, a first USB interface 38 and a second USB interface 40.

The first USB interface 38, the LED indicator module 32, the second USB interface 40, and the charging port 34 may be sequentially arranged. The LED indicator module 32 may include a plurality of LED's. In an embodiment, the LED indicator module 32 has five LED's in the control circuit board 14, to indicate the available power and the charging status of the battery module 16.

The charging port 34 may be an AC or DC charging port and is connectable to an external charging circuit adaptor for charging the battery module 16. The charging port 34 may be connected to a 110V AC adaptor or a 12V DC adaptor to charge the battery. In an embodiment, the mobile power bank of the present invention is provided in a kit with the external charging circuit adapter.

The USB output module 36 is connectable via a USB cable to support USB charging of electronic devices where the battery module 16 provides power to the electronic devices. For example, certain mobile phone products, including the iPhone® by Apple Computer®, certain electronic book reader products, such as the Kindle® by Amazon®, certain tablet computer products, such as the iPad® by Apple Computer®, digital cameras, portable gaming systems, portable music players, portable global positioning systems (GPS) and wireless headphones may be charged using a USB cable connectable to the USB output module 36.

In an embodiment, the battery module 16 is provided on the surface of the control circuit board 14 and electrically connected to the control circuit board 14. In an embodiment, the battery module 16 includes battery cells 42, a battery circuit board 44, an ignition output port 46, and a connecting ribbon cable 48. The battery cell 42 may have a multi-cell structure. In an embodiment of the present invention, the battery cell 42 has four battery cells.

In an embodiment of the present invention, the battery cell 42 is a lithium iron phosphate cell. In an additional embodiment, the battery cell 42 is a lithium cobalt oxide cell. Preferably, the output of the ignition output port's voltage is higher than about 13.6V. The voltage of the vehicle battery is generally less than about 13.6V and the output voltage of the ignition output port 46 is higher than 13.6V. The voltage differential can effectively prevent voltage reverse charging from the vehicle battery to the device 10 upon vehicle ignition start; thereby preventing reverse charging of the battery cell 42. Thus, the voltage differential protects the battery cell 42 and extends the life of the battery module 16. Lithium iron phosphate and lithium cobalt oxide battery cells have a large discharge capacity and may provide an output voltage higher than about 13.6V.

In additional embodiments, the battery cell 42 is a nickel-cadmium (NiCd) or nickel metal Hydride (NiMH) cell. The battery cell 42 may be made from other rechargeable materials that provide sufficient energy density as will be understood by those of skill in the art. The battery circuit board 44 may be provided with voltage boosting circuitry to step up the output voltage from the battery cell 42 to the ignition output port 46 to provide an output voltage higher than about 13.6V. As discussed above, output voltage higher than about 13.6V prevents reverse charging of the battery module 16 and thereby protects the battery cell 42 and extends the life of the battery module 16.

The battery circuit board 44 may be directly electrically connected to the battery cell 42. Additionally, the battery cell 42 may be connected to the control circuit board 14 by a ribbon cable 48. The ignition output port 46 may be coupled to an edge of the battery circuit board 44, and the ignition output port 46 may extend to a right edge of the base cover 20. The ignition output port 46 may be oriented parallel to the LED indicator module 32, the charging port 34 and the USB output module 36. The ignition output port 46 uses power stored in the battery cell 42 to provide power to start a vehicle engine ignition.

The output of the battery cell 42 is provided to the vehicle's ignition via a vehicle ignition cable (not shown) coupleable to the ignition output port 46. In an embodiment, the vehicle ignition cable has a first end with a connector configured to fit into the ignition output port 46 and a second end with positive and negative connectors, such as clamps or clips, that are connectable to vehicle battery terminals. The output port 46 may be a positive and negative barrel socket. In an embodiment, the mobile power bank of the present invention is provided in a kit with the vehicle ignition cable.

Once connected to a vehicle battery, when the user attempts to start the vehicle, an electrical current is passed from the battery module 16, through the output port 46, ignition cable and through the vehicle battery to the electrical system of the vehicle, thereby providing a high voltage current to start the vehicle. Once the vehicle is started, within a short time (such as a minute), the user of the vehicle may unplug the vehicle ignition cable from the vehicle battery.

Figure 3:
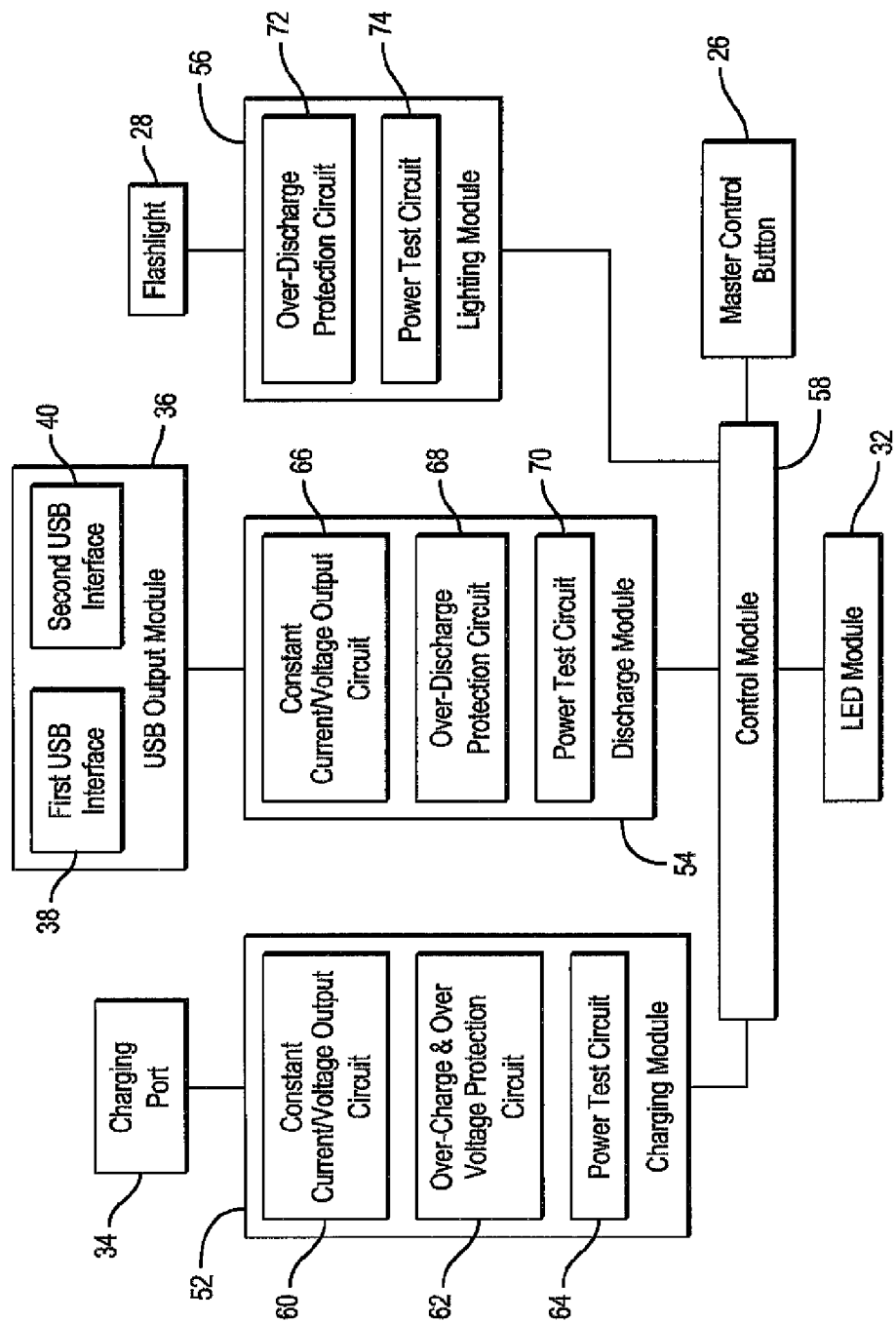
FIG. 3 is a schematic circuit diagram of a circuit board usable in the mobile power bank of FIG. 1.
Figure 3C:
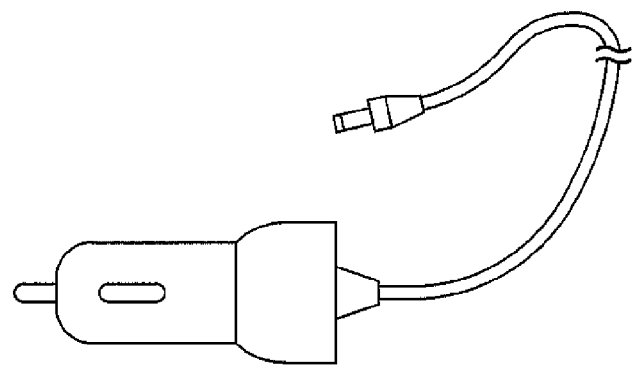
FIG. 3C is a side elevation view of a 12V DC external charging circuit adaptor.
Figure 3B:
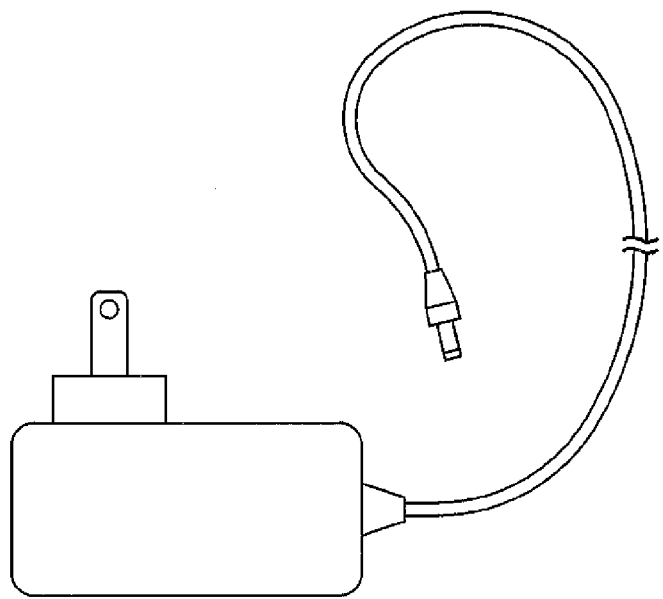
FIG. 3B is a side elevation view of a 110V external charging circuit adaptor.
Figure 3A:
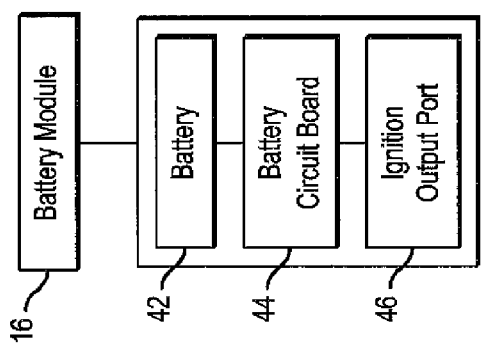
FIG. 3A is a diagram of the battery module.
Figure 5:
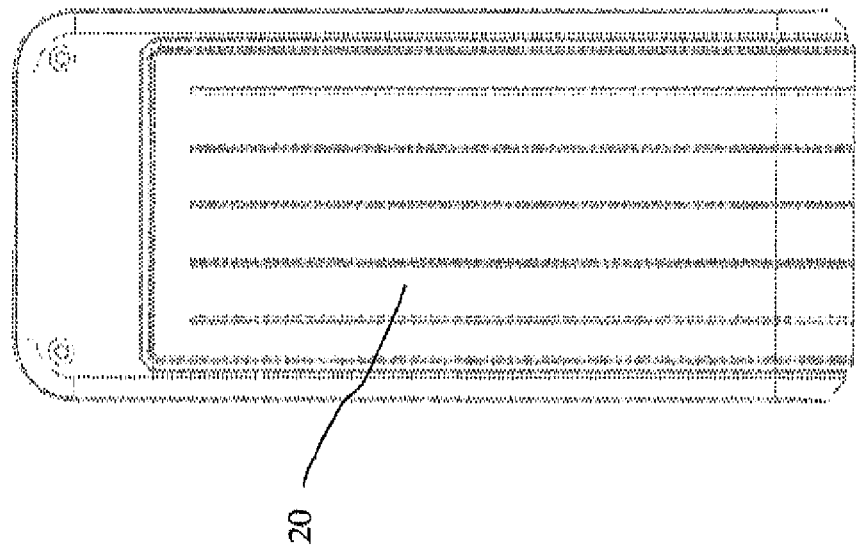
FIG. 5 is a bottom view of the mobile power bank of FIG. 1.
Figure 4:
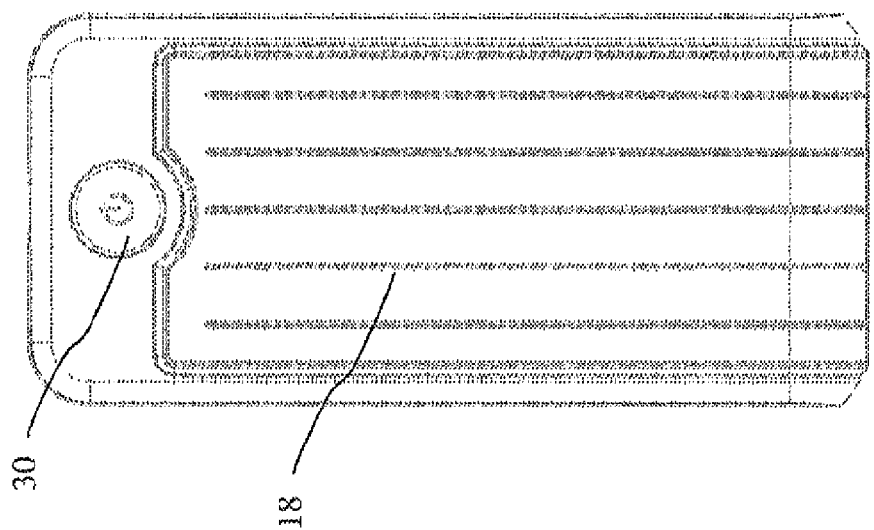
FIG. 4 is a top view of the mobile power bank of FIG. 1.
Figure 7:
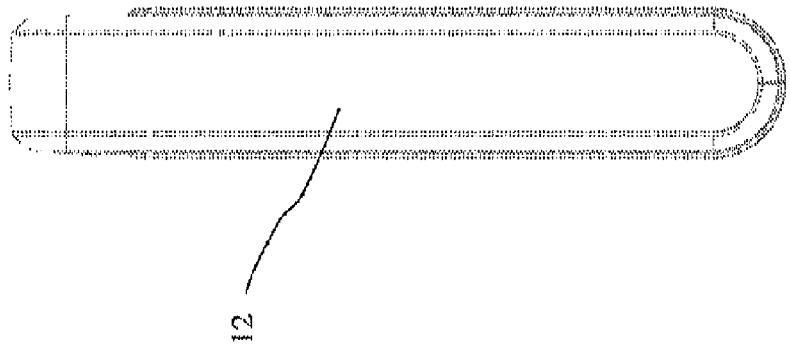
FIG. 7 is a left side elevation view of the mobile power bank of FIG. 1.
Figure 6:
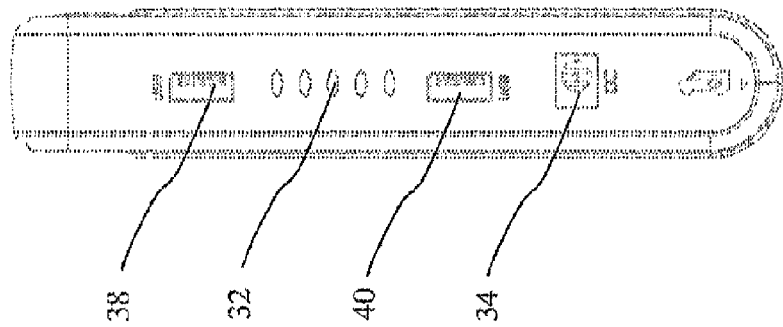
FIG. 6 is a right side elevation view of the mobile power bank of FIG. 1.
Figure 9:
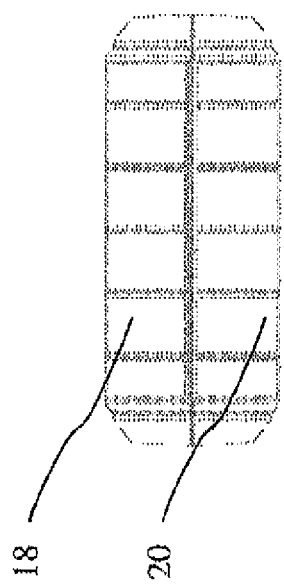
FIG. 9 is a rear elevation view of the mobile power bank of FIG. 1.
Figure 8:
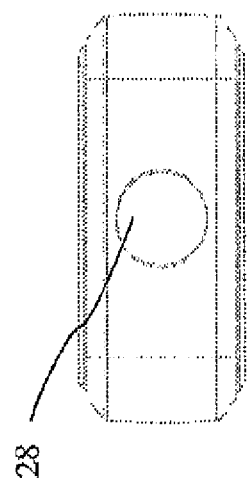
FIG. 8 is a front elevation view of the mobile power bank of FIG. 1.

Referring to FIG. 3, the control circuit board 14 may include a charging module 52, a discharge module 54, a lighting module 56, and a control module 58. The control module 58 may have a main control chip, and the control module can be connected to the charging module 52, the discharge module 54, the lighting module 56, the LED indicator module 32 and the master control button 26.

The charging module 52 is connected to the charging port 34, which may include a constant current and constant voltage input circuit 60, an over-charge and over-voltage protection circuit 62, and a charging module power test circuit 64. The constant current and constant voltage input circuit 60 provides a constant current and constant voltage to charge the battery module 16, extend battery life, and reduce battery damage. The overcharge and overvoltage protection circuit 62 protects the battery module 16 during power charging from the charging port 34 by preventing damage from charging current or charging voltage that is too high. The charging module power test circuit 64 detects a state of battery charge, such as by detecting an output voltage of the battery cell 42 during charging.

The discharge module 54 is connected to the USB (Universal Serial Bus) output module 36. In an embodiment, the discharge module 54 includes a constant current and constant voltage output circuit 66, a discharge module over-discharge protection circuit 68, and a discharge module power test circuit 70. The constant current and constant voltage output circuit 66 is coupled to the USB output module 36, so that the first USB interface 38 and the second USB interface 40 maintain a constant charging current and constant voltage.

The discharge module over-discharge protection circuit 68 is used when the battery module 16 is supplying energy via the USB output module 36. The discharge module over-discharge protection circuit 68 prevents damage to the battery module and an external device charging via the USB output module 36 when the battery module's power output is below a predetermined threshold. The discharge module power test circuit 70 determines the discharge capacity of the battery module 16, such as by for example testing the output voltage of the battery cell 42.

The lighting module 56 is connected to the flashlight 28. In an embodiment, the lighting module 56 includes a lighting module over-discharge protection circuit 72 and a lighting module power test circuit 74. The lighting module over-discharge protection circuit 72 limits discharge of the battery module 16 to the flashlight 28 when the battery power output to the flashlight is below a predetermined threshold to protect the battery module and the flashlight. The lighting module power test circuit 74 detects the battery module's power levels during illumination of the flashlight 28.

It should be understood that the charging module 52, the discharge module 54, and the lighting module 56, as functional modules referenced above, are divided circuit functions. In other embodiments, the charging module power test circuit 64, discharge module power test circuit 70 and the lighting module power test circuit 74 may be integrated into a single power test circuit. In addition, the discharge module over-discharge protection circuit 68 and the lighting module over-discharge protection circuit 72 may also be integrated into a single over-discharge protection circuit. In an additional embodiment of the present invention, the control module 58 of the control circuit board 14 controls the power instructions of the charging module 52, the discharge module 54, the lighting module 56 and the LED indicator module 32.

An example operation of the control module 58 in combination with the charging module 52 and the LED indicator module 32 will now be described. When the mobile power bank 10 is connected to an external power source for charging the battery module 16 via the charging port 34 and is in a charged state, the power test circuit 64 detects the battery capacity of the battery module 16 and activates the LED indicator module 32 for a battery charging indicator.

For example, when the power test circuit 64 detects battery voltage of the battery module 16 is lower than about 10.8V, the control module 58 may control the LED indicator module 32 to stop all LED's from lighting up. When the detected battery voltage is greater than about 12.6V, the control module 58 may control the LED indicator module 32 so that one LED is lit and another LED is flashing. When the detected battery voltage is greater than about 13V, the control module 58 may control the LED indicator module 32 so that two LED's are lit and another LED is flashing.

When the battery voltage is greater than about 13.2V, the control module 58 may control the LED indicator module 32 so that three LED's are lit and another LED is flashing. When the battery voltage is greater than about 13.3V, the control module 58 may control the LED indicator module 32 so that four LED's are lit and another LED is flashing. When the battery voltage is equal to or greater than about 13.4V, the control module 58 may control the LED indicator module 32 so that all five LED are lit. As will be understood by one of skill in the art, the number of LED's controlled by the LED module 32 and battery charge indications may be varied.

An example operation of the control module 58 in combination with the discharge module 54 and the LED indicator module 32 will now be described. When the control module 58 detects that the master control button 26 has been operated, the control module detects the amount of output power load. If there is no power load detected (if the power load current is less than about 30 mA to about 40 mA, then no power load is considered to be connected), then the control module can control the LED indicator module 32 to not light up, indicating there is no power being output.

If the discharge module power test circuit 70 indicates there is no power load when the battery voltage of the battery module 16 is lower than about 10.8V, then the control module 58 may control the LED module 32 so that one LED is flashing; when the detected battery voltage is greater than about 12.6V, the control module can control the LED module so that one LED is lit; when the detected battery voltage is greater than about 13V, the control module may control the LED module so that two LED's are lit; when the detected battery voltage is greater than about 13.2V, the control module may control the LED module so that three LED's are lit; when the detected battery voltage is greater than about 13.3V, the control module may control the LED module so that four LED's are lit; when the detected battery voltage is equal to or greater than about 13.4V, the control module can control the LED module so that all five LED's are lit.

If the master control button 26 is activated, and the control module 58 detects that the a power load is connected (for example, if a greater than 50 A power load current is detected, then a power load is considered to be connected), then the control module 58 may turn on the discharge module power test circuit 70 and the LED indicator module 32 to activate the discharged battery indicator. Specifically, when the detected voltage of the battery module 16 is equal to or lower than about 10.8V, the control module 58 may control the LED module 32 so that one LED is flashing; when the detected battery voltage is greater than about 12.6V, the control module can control the LED module 32 so that one LED is lit; when the detected battery voltage is greater than about 13V, the control module may control the LED module 32 so that two LED's are lit; when the detected battery voltage is greater than about 13.2V, the control module can control the LED module 32 so that three LED's are lit; when the detected battery voltage is greater than about 13.3V, the control module may control the LED module 32 so that four LEDs are lit; when the detected battery voltage is equal to or greater than about 13.4V, the control module can control the LED module 32 so that all five LED's are lit.

As will be understood by one of skill in the art, the power bank system 10 may have a plurality of LED indicator modules. For example, there may be a first LED indicator module for indicating battery charge level and a second LED indicator module for indicating power output level. The plurality of LED indicator modules may be controlled by the control module 58 or by separate modules, such as the power charging module 52 and the discharge module 54.

In addition, when the control module 58 detects that there is no power load connected, it can at a preset time (e.g. 10 seconds) turn off the control voltage output and enter a power-down mode. If the control module 58 detects that there is a power load connected, the control module will turn on the voltage output control circuit 66 to send out continuous voltage output. If the voltage current of the battery module 16 is lower than about 10.8V, then the control module 58 may turn off the output voltage.

When the control module 58 detects that the master control button 26 is activated for an extended period of time, such as about 2 seconds, the control module can turn on the lighting module 56 to illuminate the flashlight 28. After turning on the flashlight 28, if the control module 58 detects that the master control button 26 is activated, it may control the flashlight in multiple illumination modes, such as a constant light mode, flashing strobe light mode, and flashing S.O.S. (three sequential short flashes, followed by three sequential long flashes, followed again by three sequential short flashes) signal light mode. If, after flashlight activation, the master control button 26 is pressed for an extended period of time, such as about 2 seconds, the control module 58 may control the lighting module 56 to turn off the flashlight 28.

In an embodiment, sidewalls of the upper cover 18 have openings adjacent to the flashlight 28, the charging port 34, the USB interfaces 38, 40, the LED indicator module 32, and the ignition output port 46. The openings allow the flashlight 28 and LED indication lights of the LED indicator module 32 to emit light outside of the housing 12 and allow external devices and adaptors access to the charging port 34, the USB interfaces 38, 40 and the ignition output port 46.

The present invention provides a mobile power bank 10 that is not only capable of providing enough power to start a vehicle ignition, but also charges electronic devices and provides a flashlight function, so it can meet multifunctional mobile power needs. The mobile power bank's mobile control circuit board 14 with a variety of protection circuits, such as over-discharge protection circuit, overcharge and overvoltage protection circuits, a constant current and constant voltage input circuits, a constant current and constant voltage output circuits, can effectively extend battery life and reduce battery damage.

Importantly, the mobile power bank system 10 of the present invention is portable enough to be easily carried by a user. In an embodiment of the present invention, the mobile power bank system 10 is small enough to be carried in a pocket by a user. Alternatively, the mobile power bank system 10 may be configured for placement in a vehicle glove box or vehicle door compartment for easy storage and access by a user in case of emergency.

There is disclosed in the above description and the drawings, a medical camera system which fully and effectively overcomes the disadvantages associated with the prior art. However, it will be apparent that variations and modifications of the disclosed embodiments may be made without departing from the principles of the invention. The presentation of the preferred embodiments herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. §112.

What is claimed is:

1. A portable apparatus, easily carried by a user, for providing power comprising:
    a housing;
    a battery module positioned inside of the housing, the battery module further comprising:
    a battery;
    a battery circuit board coupled to the battery; and
    an ignition output port coupled to the battery circuit board;
    a circuit board positioned inside of the housing and coupled to the battery module, the circuit board comprising:
    a charge module;
    a discharge module;
    a lighting module; and
    a control module coupled to the charge module, the discharge module and the lighting module;
    a light source coupled to the circuit board;
    a charging port coupled to the charge module;
    at least one Universal Serial Bus interface coupled to the discharge module;
    a Light Emitting Diode indicator module coupled to the circuit board; and
    wherein the apparatus is configured to provide sufficient power to jump start a vehicle.

2. The apparatus of claim 1 wherein the battery module outputs power through the ignition output port at a voltage higher than 10.8 volts to 13.6 volts.

3. The apparatus of claim 2 wherein the ignition output port further comprises a positive and negative barrel jack, which connect to the vehicle ignition jumper cable.

4. The apparatus of claim 3 wherein the battery further comprises at least one of the group consisting of: a lithium iron phosphate battery cell and a lithium cobalt oxide battery cell.

5. The apparatus of claim 4 wherein the battery circuit board is configured to boost battery voltage output to the ignition output port to higher than 10.8 volts to 13.6 volts.

6. The apparatus of claim 1 wherein the charge module further comprises a constant current and constant voltage input circuit, an over-charge and over-voltage protection circuit, and charging module power test circuit.

7. The apparatus of claim 1 wherein the discharge module further comprises a constant current and constant voltage output circuit, a discharge module over-discharge protection circuit, and a discharge module power test circuit.

8. The apparatus of claim 1 wherein the lighting module further comprises a lighting module over-discharge protection circuit and a lighting module power test circuit.

9. The apparatus of claim 1 wherein the battery circuit board is coupled to the circuit board by a ribbon cable.

10. The apparatus of claim 1 wherein the Light Emitting Diode indicator module is configured to indicate a charge level of the battery module.

11. The apparatus of claim 1 wherein the charging port, the at least one Universal Serial Bus interface, Light Emitting Diode indicator module, and ignition output port are sequentially arranged on a side of the housing.

12. The apparatus of claim 11, further comprising two Universal Serial Bus interfaces, wherein the ignition output port is positioned adjacent to a first side of the charging port, and the two USB (Universal Serial Bus) interfaces are positioned adjacent to a second side of the charging port and the Light Emitting Diode indicator module is positioned in between the two Universal Serial Bus interfaces.

13. The apparatus of claim 12 wherein the circuit board further comprises a master control button and the housing further comprises a button cap positioned adjacent the master control button such that operation of the button cap causes operation of the master control button.

14. The apparatus of claim 1 further comprising an external charging circuit adapter having a first end coupleable to the charging port and a second end coupleable to an external power supply.

15. The apparatus of claim 1 further comprising a vehicle ignition cable having a first end coupleable to the ignition output port and a second end coupleable to terminals of a vehicle battery.

16. The apparatus of claim 1 wherein the apparatus is configured to be storable in a clothing pocket.

17. A portable apparatus, easily carried by a user, for providing power comprising:
    a housing containing therein the following;
    a battery module positioned inside of the housing, the battery module comprising:
    a battery comprising one of the group consisting of: a lithium ironphosphate battery cell and a lithium cobalt oxide battery cell;
    a battery circuit board coupled to the battery; and
    an ignition output port coupled to the battery circuit board;
    a circuit board positioned inside of the housing coupled to the battery module, the circuit board comprising:
    a charge module having a constant current and constant voltage input circuit; an over-charge and over-voltage protection circuit; and a charging module power test circuit;
    a discharge module having a constant current and constant voltage output circuit;
    a discharge module over-discharge protection circuit; and a discharge module power test circuit;
    a lighting module having a lighting module over-discharge protection circuit; and a lighting module power test circuit;
    a control module coupled to the charge module, the discharge module and the lighting module;
    a light source coupled to the circuit board;
    a charging port coupled to the charging module;
    at least one Universal Serial Bus interface coupled to the discharge module; and a Light Emitting Diode indicator module coupled to the circuit board and configured to indicate a charge level of the battery;

wherein the apparatus is configured to provide sufficient power to jump start a vehicle at a voltage range of 10.8 volts to 13.6 volts.

18. The apparatus of claim 17 further comprising an external charging circuit adapter having a first end coupleable to the charging port and a second end coupleable to an external power supply.

19. The apparatus of claim 17 further comprising a vehicle ignition cable having a first end coupleable to the ignition output port and a second end coupleable to terminals of a vehicle battery.

20. The apparatus of claim 17 wherein the apparatus is configured to be storable in a clothing pocket.

21. A mobile power bank comprising a housing, a control circuit board, and a battery module;

the housing comprising an upper cover and a base cover, the upper cover coupled to the base cover to form an enclosed storage space;

the control circuit and the battery module fixed inside the storage space;

the base cover having a first plate perpendicular to the base cover, an edge of the first plate connected to a second plate, both plates mounted to the base cover;

a master control button and a flashlight positioned on the second plate;

the flashlight placed adjacent an edge of the base cover;

the master control button placed in a direction parallel to the second plate;

the upper cover having a button cap which is operated to press the master control button;

the first plate having an LED indicator module, a charging port and a USB output module, all located in the body of the first plate, on the same side, near an edge of the base cover, the USB output module having one or more USB interfaces.

22. The mobile power bank of claim 21 in which there are two USB interfaces, the first USB interface, the LED indicator module, the second USB interface and the charging port which are sequentially arranged.

23. The mobile power bank of claim 22 in which the charging port is connectable to an external charging circuit adaptor to charge the battery module.

24. The mobile power bank of claim 21 in which the entire mobile power bank is located in a kit along with external charging adapters and jumper cables.

25. The mobile power bank of claim 24 in which the charging adaptors comprise a 110V AC adaptor and a 12V DC adaptor to charge the battery module and one or more USB cables to charge external electronic devices.

* * * * *